(12) United States Patent
Assmann

(10) Patent No.: US 8,489,928 B1
(45) Date of Patent: Jul. 16, 2013

(54) APPARATUS AND METHOD FOR DYNAMIC REMOVAL AND ADDITION OF ELECTRONIC MESSAGING SERVICES

(75) Inventor: Claus Assmann, Berkeley, CA (US)

(73) Assignee: Sendmail, Inc., Emeryville, CA (US)

( * ) Notice: Subject to any disclaimer, the term of this patent is extended or adjusted under 35 U.S.C. 154(b) by 357 days.

(21) Appl. No.: 12/858,256

(22) Filed: Aug. 17, 2010

(51) Int. Cl.
*G06F 11/00* (2006.01)

(52) U.S. Cl.
USPC ........................................... 714/38.1

(58) Field of Classification Search
None
See application file for complete search history.

(56) References Cited

U.S. PATENT DOCUMENTS 7,103,635 B2 * 9/2006 Baldwin et al. .............. 709/206
2006/0168057 A1 * 7/2006 Warren et al. ................ 709/206

OTHER PUBLICATIONS

Klensin et al., "RFC 1869 SMTP Service Extensions", Nov. 1995, pp. 1-11.*

* cited by examiner

*Primary Examiner* — Michael Maskulinski
(74) *Attorney, Agent, or Firm* — Kilpatrick Townsend & Stockton LLP

(57) ABSTRACT

A computerized method for electronic communication includes issuing via a mail client a set of extensions in a command to a MX server for an initial electronic communication; determining in the mail client one or more of the extensions, which failed; and for a subsequent electronic communication between the mail client and the MX server, for a predetermined time period, not issuing to the MX server by the mail client the one or more extensions, which failed.

37 Claims, 3 Drawing Sheets

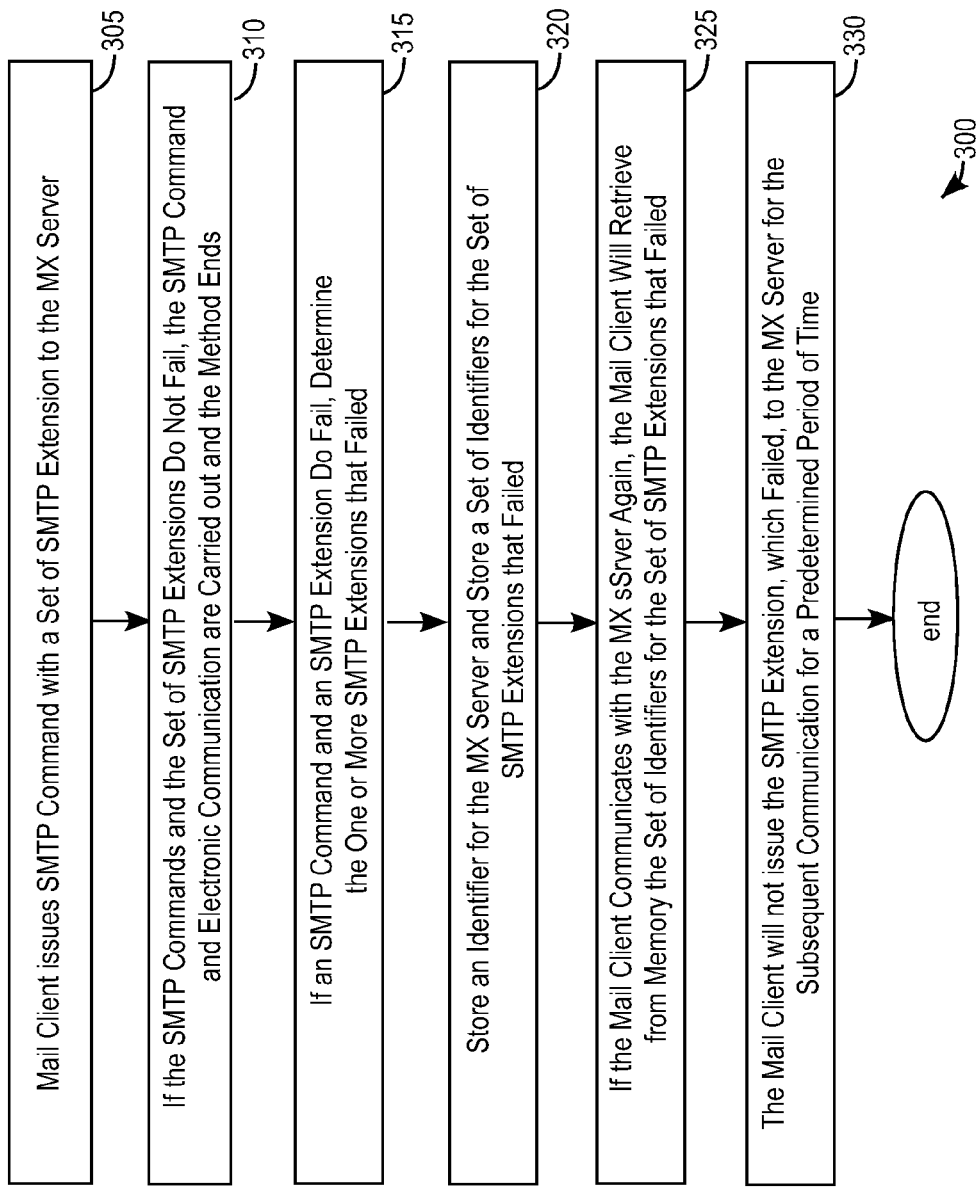

APPARATUS AND METHOD FOR DYNAMIC REMOVAL AND ADDITION OF ELECTRONIC MESSAGING SERVICES

BACKGROUND OF THE INVENTION

The present invention generally relates to electronic messaging. More particularly, the present invention relates to an apparatus and method for removal and addition of services associated with simple mail transfer protocol (SMTP) extensions associated with electronic communications.

Electronic messages, such as e-mail, sent from a mail client to a mail server are occasionally not accepted by the mail server because of communication incompatibility between the mail client and the mail server. The same is also occasionally true for electronic messages attempted to be delivered from a mail server to a mail client. There may be an error or an incompatibility in the implementation of some SMTP extensions between a mail client and a mail server that prevents the sending and receiving of e-mail. For example, a mail client might attempt to make a STARTTLS connection with a mail server and the mail server might not be properly configured for such a connection or might use the STARTTLS extension in a way that makes the establishment of the TLS connection not possible. The mail client might continue to try to make a STARTTLS connection with the mail server without success. The mail from the mail client to the mail server may back up in the mail client's mail queue. Traditionally, a human administrator of the mail client might notice that the mail queue is backing up, and might determine that the mail server is not properly configured to accept to the a STARTTLS connection with the mail client, or might otherwise not use the request for a STARTTLS connection as expected by the mail client. The human administrator might configure the mail client to not attempt to make a STARTTLS connection with this particular server in the future. More generally, the human administrator will stop a mail client or a mail server from using a failed SMTP extension to that electronic communications may proceed.

Human intervention in an e-mail communication problem is inefficient. New apparatus and methods are needed to eliminate the need for human intervention for addressing communication incompatibility between a mail client and a mail server.

BRIEF SUMMARY OF THE INVENTION

The present invention generally relates to electronic messaging. More particularly, the present invention relates to an apparatus and method for removal and addition of services associated with simple mail transfer protocol (SMTP) extensions associated with electronic communications.

A computerized method for electronic communication includes issuing via a mail client a set of extensions in a command to a mail exchange (MX) server for an initial electronic communication; determining in the mail client one or more of the extensions, which failed; and for a subsequent electronic communication between the mail client and the MX server, for a predetermined time period, not issuing to the MX server by the mail client the one or more extensions, which failed.

According to a specific embodiment, the method further includes storing via the mail client in a failure database an identifier for the MX server; storing via the mail client in the failure database a set of identifiers, wherein the set of identifiers respectively identifies the one or more extensions, which failed; and prior to the step of not issuing, querying the failure database for the identifier for the MX server, and the set of identifiers for the one or more extensions, which failed, and the step of not issuing is based on the querying step.

According to another specific embodiment, the method further includes for a subsequent electronic communication between the mail client and the MX server, for a predetermined time period, issuing an extension to the MX server by the mail client wherein the extension issued in the subsequent electronic communication is not the one or more extensions, which failed. The step of not issuing is carried out for a predetermined period of time.

According to another specific embodiment, the method further includes: issuing the one or more extension, which failed, to the MX server by the mail client after the predetermined period of time.

According to another specific embodiment, i) the one or more extensions that failed are for a session, ii) the initial electronic communication is in an initial session, iii) the subsequent electronic communication is in a subsequent session, which follows the initial session, and iv) the step of not issuing to the MX server by the mail client the one or more extension, which failed, is in the subsequent session.

According to another specific embodiment, i) the one or more extensions that failed are for a transaction, ii) the initial electronic communication is in an initial session, iii) the subsequent electronic communication is in the initial session, and iv) the step of not issuing to the MX server by the mail client the one or more extension, which failed, is in the initial session, but is not in a subsequent session, which follows the initial session.

According to another embodiment of the present invention, a computerized method for electronic communication includes issuing via a mail client a set of extensions in a command to an MX server for an initial electronic communication; determining in the mail client one or more of the extensions, which failed; and for a subsequent electronic communication between the mail client and the MX server, for a predetermined time period, issuing via the mail client another extension to the MX server, wherein the other extension is not the one or more extensions, which failed.

According to a specific embodiment, the method further includes storing via the mail client in a failure database an identifier for the MX server; storing via the mail client in the failure database a set of identifiers, wherein the set of identifiers respectively identifies the one or more extensions, which failed; and prior to the second mentioned issuing step, querying the failure database for the identifier for the MX server and the set of identifiers for the one or more extensions, which failed, and the second mentioned issuing step is based on the querying step.

For the subsequent electronic communication between the mail client and the MX server, for the predetermined time period, not issuing to the MX server by the mail client the one or more extensions, which failed.

According to another specific embodiment, the method further includes issuing the one or more extension, which failed, to the MX server by the mail client after the predetermined period of time.

According to another specific embodiment, i) the one or more extensions that failed are for a session, ii) the initial electronic communication is in an initial session, iii) the subsequent electronic communication is in a subsequent session, which follows the initial session, and iv) the step of issuing via the mail client the other extension to the MX server is in the subsequent session.

According to another specific embodiment, i) the one or more extensions that failed are for a transaction, ii) the initial electronic communication is in an initial session, iii) the subsequent electronic communication is in the initial session, and iv) the step of issuing via the mail client the other extension to the MX server, is in the initial session, but is not in a subsequent session, which follows the initial session.

According to another embodiment, a computer system includes a processor configured to execute an electronic communication process, wherein the communication process includes: issuing a set of extensions in a command to a MX server for an initial electronic communication; determining one or more of the extensions, which failed; and for a subsequent electronic communication to the MX server, for a predetermined time period, issuing another extension to the MX server, wherein the other extension is not the one or more extensions, which failed.

According to another specific embodiment, the computer system further includes a machine-readable memory, wherein the communication process further includes: i) storing in a failure database in the machine-readable memory an identifier for the MX server; ii) storing in the failure database in the machine-readable memory a set of identifiers, wherein the set of identifiers respectively identifies the one or more extensions, which failed; and iii) prior to the second mentioned issuing step, querying the failure database in the machine-readable memory for the identifier for the MX server and the set of identifiers for the one or more extensions, which failed, and the second mentioned issuing step is based on the querying step.

According to another specific embodiment, the communication process includes not issuing to the MX server the one or more extensions, which failed, for the subsequent electronic communication to the MX server, for the predetermined time period. The communication process may further include: after the predetermined period of time, issuing the one or more extension, which failed, to the MX server.

According to another specific embodiment: i) the one or more extensions that failed are for a session, ii) the initial electronic communication is in an initial session, iii) the subsequent electronic communication is in a subsequent session, which follows the initial session, and iv) the step of issuing the other extension to the MX server is in the subsequent session.

According to another specific embodiment: i) the one or more extensions that failed are for a transaction, ii) the initial electronic communication is in an initial session, iii) the subsequent electronic communication is in the initial session, and iv) the step of issuing the other extension to the MX server, is in the initial session, but is not in a subsequent session, which follows the initial session. According to one embodiment, the computer system is a mail server. According to an alternative embodiment, the computer system is configured to operate as a mail client.

According to one embodiment of the present invention, a computerized method for electronic communication includes offering via an MX server a set of extensions in an SMTP response to a mail client for an initial electronic communication, and determining in the MX server one or more of the extensions, which failed. The method further includes for a subsequent electronic communication between the MX server and the mail client, for a predetermined time period, not offering to the mail client by the MX server the one or more extensions, which failed.

According to a specific embodiment of the present invention, the method further includes storing via the MX server in a failure database an identifier for the mail client; and storing via the MX server in the failure database a set of identifiers, wherein the set of identifiers respectively identifies the one or more extensions, which failed. The specific embodiment includes, prior to the step of not offering, querying the failure database for the identifier for the mail client, and the set of identifiers for the one or more extensions, which failed, and the step of not offering is based on the querying step.

According to a specific embodiment of the present invention, the method further includes for a subsequent electronic communication between the MX server and the mail client, for a predetermined time period, offering an extension to the mail client by the MX server wherein the extension offered in the subsequent electronic communication is not the one or more extensions, which failed. According to one embodiment, the step of not offering is carried out for a predetermined period of time. After the predetermined period of time, the one or more extension, which failed, are offered to the mail client by the MX server.

According to a specific embodiment of the present invention, i) the one or more extensions that failed are for a session, ii) the initial electronic communication is in an initial session, iii) the subsequent electronic communication is in a subsequent session, which follows the initial session, and iv) the step of not offering to the mail client by the MX server the one or more extension, which failed, is in the subsequent session. According to an alternative embodiment, i) the one or more extensions that failed are for a transaction, ii) the initial electronic communication is in an initial session, iii) the subsequent electronic communication is in the initial session, and iv) the step of not offering to the mail client by the MX server the one or more extension, which failed, is in the initial session, but is not in a subsequent session, which follows the initial session.

According to one embodiment of the present invention a computerized method for electronic communication includes offering via an MX server a set of extensions in an SMTP response to a mail client for an initial electronic communication, and determining in the MX server one or more of the extensions, which failed. The method includes, for a subsequent electronic communication between the MX server and the mail client, for a predetermined time period, offering via the MX server another extension to the mail client, wherein the other extension is not the one or more extensions, which failed.

According to a specific embodiment of the present invention, the method further includes i) storing via the MX server in a failure database an identifier for the mail client; ii) storing via the MX server in the failure database a set of identifiers, wherein the set of identifiers respectively identifies the one or more extensions, which failed; and iii) prior to the second mentioned offering step, querying the failure database for the identifier for the mail client and the set of identifiers for the one or more extensions, which failed, and the second mentioned offering step is based on the querying step. For the subsequent electronic communication between the MX server and the mail client, for the predetermined time period, the method includes not offering to the mail client by the MX server the one or more extensions, which failed. After the predetermined period of time, the method includes offering the one or more extension, which failed, to the mail client by the MX server.

According to a specific embodiment of the present invention, i) the one or more extensions that failed are for a session, ii) the initial electronic communication is in an initial session, iii) the subsequent electronic communication is in a subsequent session, which follows the initial session, and iv) the step of offering via the MX server the other extension to the mail client is in the subsequent session.

According to a specific embodiment of the present invention, i) the one or more extensions that failed are for a transaction, ii) the initial electronic communication is in an initial session, iii) the subsequent electronic communication is in the initial session, and iv) the step of offering via the MX server the other extension to the mail client, is in the initial session, but is not in a subsequent session, which follows the initial session.

According to one embodiment, a computer system includes a processor configured to execute an electronic communication process, where the communication process includes i) offering a set of extensions in an SMTP response to a mail client for an initial electronic communication; iii) determining one or more of the extensions, which failed; and iii) for a subsequent electronic communication to the mail client, for a predetermined time period, offering another extension to the mail client, wherein the other extension is not the one or more extensions, which failed. The computer system may further include a machine-readable memory, wherein the communication process further includes: i) storing in a failure database in the machine-readable memory an identifier for the mail client; ii) storing in the failure database in the machine-readable memory a set of identifiers, wherein the set of identifiers respectively identifies the one or more extensions, which failed; and iii) prior to the second mentioned offering step, querying the failure database in the machine-readable memory for the identifier for the mail client and the set of identifiers for the one or more extensions, which failed, and the second mentioned offering step is based on the querying step. The computer system is a mail server.

These and other embodiments of the present invention are described in more detail in conjunction with the text below and the attached figures.

BRIEF DESCRIPTION OF THE DRAWINGS

FIG. 3 is a high-level flow diagram of an electronic communication method according to another embodiment of the present invention.

DETAILED DESCRIPTION OF EMBODIMENTS OF THE INVENTION

The present invention provides an apparatus and method for electronic messaging. More particularly, the present invention provides an apparatus and method for removal and addition of services associated with simple mail transfer protocol (SMTP) extensions associated with electronic communications.

The electronic communications, such as e-mail, between a mail client and a mail server occasionally fail or are delayed because of protocol incompatibilities between the mail client and the mail server. More specifically, various electronic communication services are requested or offered via simple mail transfer protocol (SMTP) extensions during an SMTP transaction and/or an SMTP session. An SMTP session, for example, includes the issuance of an SMTP command (MAIL, RCPT, DATA, etc.) and/or an SMTP extension (e.g., EHLO, STARTTLS, AUTH, etc), and the receipt of an SMTP code (e.g., a three digit numeric code), which are responsive to the SMTP command. The SMTP code may indicate whether the SMTP command: i) was accepted (a three digit 2XX code), ii) was subject to a temporary failure or restriction (a three digit 4XX code), or iii) failed definitively and permanently (a three digit 5XX code). An SMTP session is defined by an initial opening sequence initiated between a mail client and a mail server, all SMTP transactions occurring during the SMTP session, and a final closing sequence between the mail client and the mail server.

During an SMTP transaction for an SMTP session, one or more SMTP extensions might fail or otherwise might not be accepted by a mail server, where the mail server is issued the one or more SMTP extensions by a mail client, or by the mail client, which is offered the one or more SMTP extension by the mail server. Example SMTP extensions that may be offered by a mail server to a mail client may include 8BIT-MIME, AUTH, DELIVERYBY, STARTTLS, PIPELINING, SIZE, DSN, ETRN, etc. For the mail client, SMTP extensions that might cause communication failures or delays for the MAIL command and the RCPT command may include for the MAIL command: SIZE=value, BODY=type, ENVID=id, RET=what, AUTH=id, BY=time, etc., and may include for the RCPT command: NOTIFY=what, ORCPT=address, etc.

Figure 1:
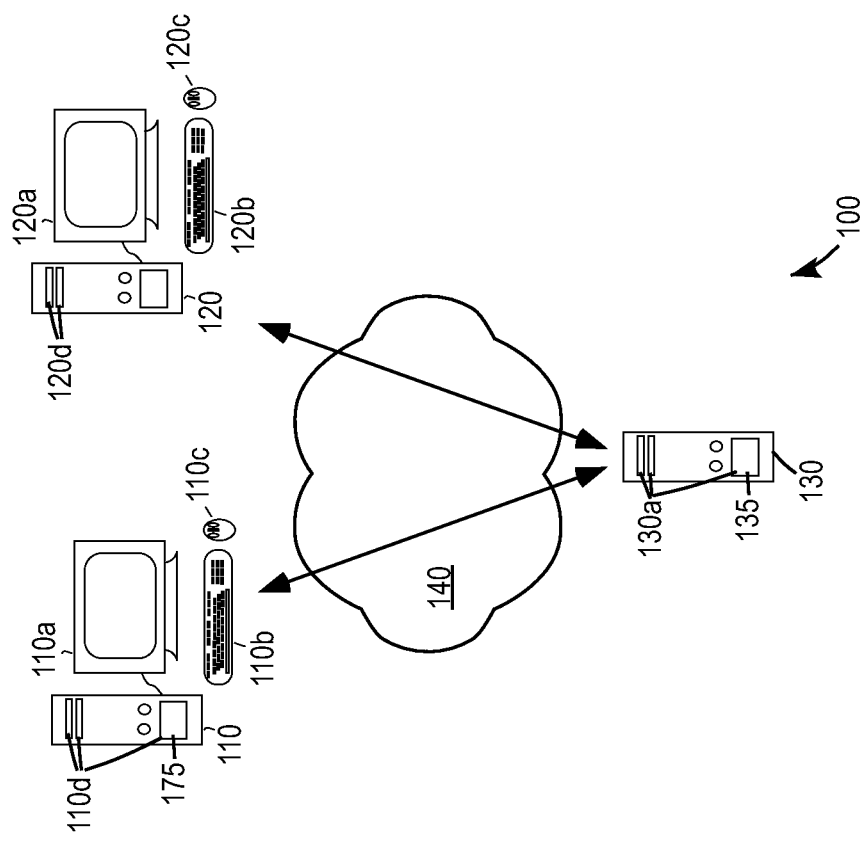
FIG. 1 is a simplified schematic of a communication system according to one embodiment of the present invention.

FIG. 1 is a simplified schematic of a communication system 100 according to one embodiment of the present invention for inhibiting failures and delays of electronic communications associated with the particular SMTP extension used for SMTP commands in SMTP transactions and SMTP sessions. Communication system 100 includes a first computer system 110, a second computer system 120, a mail exchange (MX) server 130, and a network 140.

Computer system 110 may include a personal computer (e.g., desktop, laptop, notebook, etc.), a mobile communication device, a mail server operating as a mail transfer agent (MTA), or the like. Computer system 110 may be configured to operate as a mail client. Computer system 110 may include a computer monitor 110a on which visual information may be presented to a user (e.g., a human user). Computer system 110 may also include one or more control devices, such as a keyboard 110b, a mouse 110c, a puck, a joystick, etc. The computer system may also include one or more processors, and one or more machine-readable memories 110d. The machine-readable memories may be configured to store application software, computer code, etc., which may be run by the processor to effect the computerized methods of the embodiments of the present invention. The machine-readable memories may include a RAM, a ROM, a CD and drive for the CD, a hard disk drive, an optical drive, etc. According to an embodiment where the computer system is a mobile communication device, the computer system may be a cellular telephone, a smart phone, a personal digital assistant, or the like that may be wireless application protocol (WAP) enabled. According an embodiment where the computer system is a server computer, the server computer may be configured to operate a server operating system and perform server operations. Computer system 110 may be configured to run an e-mail client that is configured to send and receive e-mail. Computer system 110 as discussed herein is the computer system from which spam is sent.

Recipient computer system 120 may be similarly configured to computer system 110 and may include a personal computer, a mobile communication device, a mail server operating as a mail transfer agent (MTA), or the like. Computer system 120 may be configured to operate as a mail client. The recipient computer system may be a desktop computer, a laptop computer, a netbook computer, a touch pad computer, or the like. Recipient computer system 120 may include a computer monitor 120a on which visual information may be presented to a user (e.g., a human user). Recipient computer system 120 may also include one or more control devices, such as a keyboard 120b, a mouse 120c, a puck, a joystick, etc. The recipient computer system may also include one or more processors, and one or more machine-readable memories 120d. The machine-readable memories may be configured to store application software, computer code, etc. which may be run by the processor to effect the computerized methods of the embodiments of the present invention described herein. The machine-readable memories may include a RAM, a ROM, a CD and drive for the CD, a hard disk drive, an optical drive, etc. According to an embodiment where the computer system is a mobile communication device, the computer system may be a cellular telephone, a smart phone, a personal digital assistant, or the like that may be wireless application protocol (WAP) enabled. According an embodiment where the recipient computer system is a server computer, the server computer may be configured to operate a server operating system and perform server operations. Computer system 120 may be configured to run an e-mail client that is configured to send and receive e-mail. The mail client operating on computer system 120 as discussed herein is the mail client, which is configured to receive an e-mail from computer system 110 transmitted through mail server 130.

MX server 130 includes a server computer operating server software and mail transfer agent (MTA) software. Mail transfer agent software is generally referred to herein as MTA. The MX server is configured to receive e-mail and forward the e-mail to a mail store that accessible to an intended recipient. The MX server includes a machine-readable memory 130a configured to store computer code for the software. The computer code, the executed computer code, and the MX server executing the computer code are embodiments of the present invention.

First computer system 110, second computer system 120, and MX server 130 are configured to communicate with one another via network 140. Network 140 may include a variety of networks including local area networks (LANs), such as intranets, proprietary networks, wide area networks (WANs), such as the Internet, and other networks in use at the time.

Figure 2:
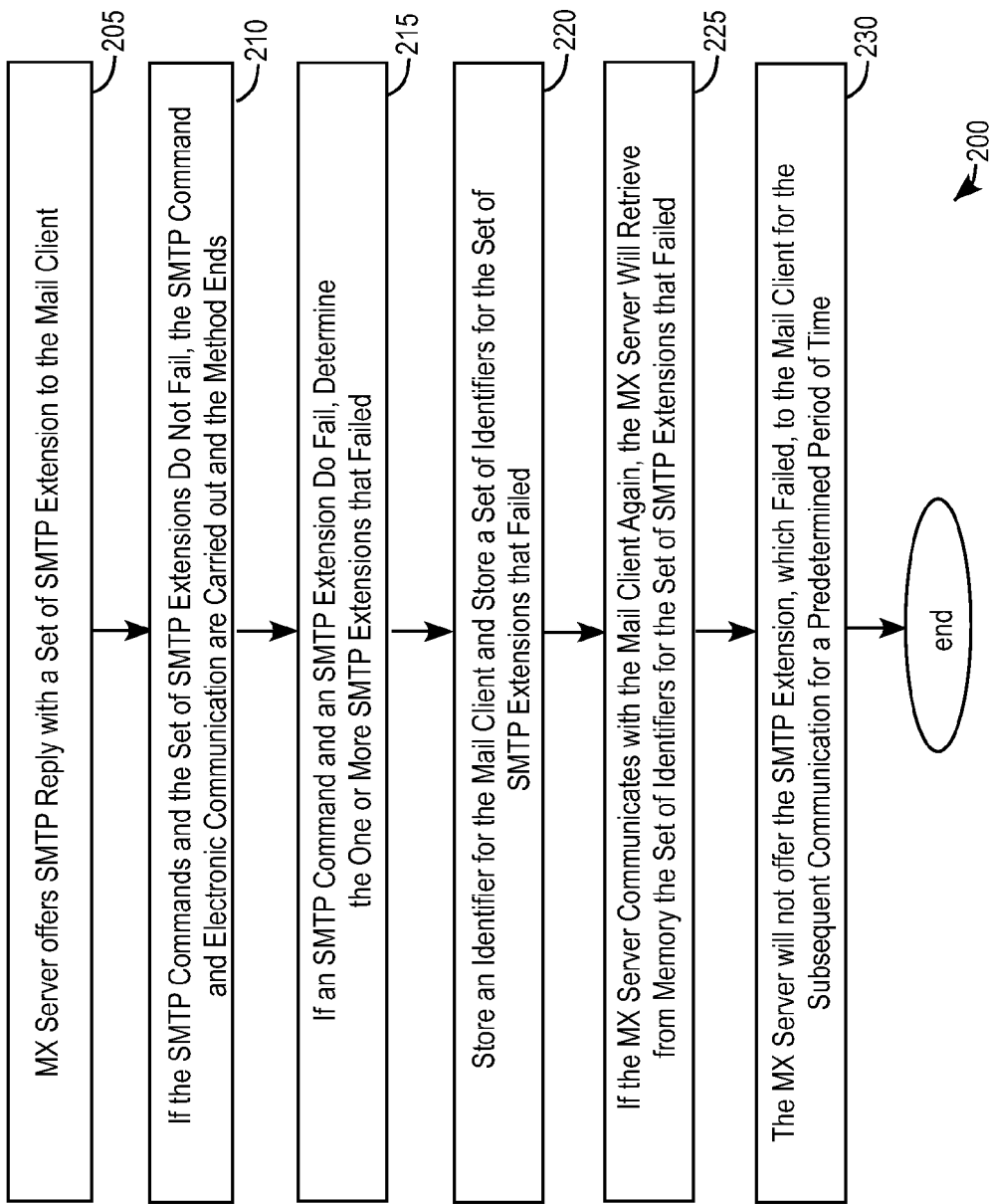
FIG. 2 is a high-level flow diagram of an electronic communication method according to one embodiment of the present invention.

FIG. 2 is a high-level flow diagram of an electronic communication method 200 according to one embodiment of the present invention. At an initial step 205 the MX server offers an SMTP reply to a mail client (e.g., operating on computer system 110) for an SMTP command issued by the mail client to the MX server, where the SMTP reply lists a set of SMTP extensions. A set as referred to herein includes one or more elements. If the SMTP reply and SMTP extensions do not fail, the SMTP reply and the electronic communication are carried out and the method ends (step 210). If the SMTP reply and one or more of the SMTP extensions fail, at a step 215, the MX server determines which of the SMTP extensions (one or more SMTP extensions) offered with the SMTP reply failed or otherwise was not accepted by the mail client. The determination of an SMTP reply failure is well understood by those of skill in the art and will not be described in detail herein. The particular SMTP extension that failed in a set of SMTP extension may be determined by a variety of techniques. For example, the MX server may remove one or more of the SMTP extensions from the SMTP reply and re-offer the SMTP reply to attempt to determine the exact SMTP extension that caused the failure. SMTP extensions may be removed from a SMTP reply one-by-one, may be removed in sets of two or more, may be removed in a select order (first to last, last to first, etc.), etc. SMTP extensions may also be removed based on a known likelihood of the SMTP extensions that are most likely to have failed. That is, one or more SMTP extensions that have a high likelihood of failure may be removed from a SMTP reply before other SMTP extensions having a lower likelihood to fail are removed from the SMTP reply. A variety of combinations of SMTP extensions might be removed to determine the particular SMTP extension that failed.

Once the particular one or more SMTP extensions that failed are identified, at a step 220, the MX server stores an identifier for the mail client and stores a set of identifiers for the one or more SMTP extensions that failed for this mail client. According to one embodiment, step 220 is not executed unless the SMTP extension that failed, fails more than a predetermined threshold number of times. That is, the mail client is given a number of chances to try correctly to the one or more SMTP extensions in a SMTP reply in case the error is temporary on a relatively short term basis.

The identifier for the mail client may be any of a variety of identifiers that identify the mail client, such as a domain name, an IP address, etc. The identifiers for the SMTP extensions may include text strings (e.g., 8BITMIME, AUTH, DELIVERYBY, STARTTLS, PIPELINING, SIZE, DSN, ETRN, etc.) for the SMTP extension, may includes codes (numeric, alphanumeric, symbols, etc.) that identify the SMTP extensions, or the like. The MX server may store (e.g., create or updates an entry) the identifier for the mail client and the set of identifiers for the one or more failing SMTP extensions in a failure database 135 in the MX server's machine-readable memory. According to a specific embodiment, MX server is configured to store a time stamp and a date stamp for the time and date at which the entry was made in the machine-readable memory.

At a step 225, if the MX server communicates with this particular mail client at a later time, the MX server is configured to retrieve from the failure database the stored identifiers for the one or more failed SMTP extensions. The MX server may retrieve the stored identifier for the one or more failed SMTP extensions based on the stored identifier for the mail client. At a step 230, for the communication of step 225, the MX server will not offer these particular failing SMTP extensions in the SMTP replies sent to this particular mail client. Step 230 may be executed within a predetermined period of time. For example, step 230 may be executed five minutes after the failures with the SMTP extensions are determined to allow the MX server to re-attempt the electronic communication with the original SMTP replies and the original SMTP extensions with this particular mail client in case the failures are temporary. Step 230 might not be executed the following day, e.g., 24 hours later. The above described time period of 5 minutes to 24 hours is an example time period and is not limiting on the claims.

The following description provides a more specific example of the above described high-level flow diagram. At an initial step, the MX server may offer a STARTTLS extension to the mail client. The mail client may try to execute a TLS handshake with the MX server to establish the TLS connection. If the TLS handshake succeeds, the electronic communication proceeds as normal with an e-mail being transmitted between the MX server and the mail client. If the TLS handshake fails, the MX server may determine that this particular mail client cannot properly use the STARTTLS extension and cannot establish a TLS connection with the MX server. The MX server may store in the MX server's failure database an identifier for this particular mail client, an identifier for the STARTTLS extension, a time stamp (e.g., 12:05 pm), and a date stamp (e.g., Feb. 19, 2010) for the time and date on which the failure occurred. If this particular mail client initiates a subsequent connection with the MX server, the MX server will look up the failing SMTP extension in the failure database and will not offer a STARTTLS extension to this particular mail client within a predetermined time period. For example, the time period might be 5 minutes after the initial failure up to 24 hours after the initial failure or 24 hours after the predetermined time period started. Prior to the beginning of the time period and after the end of the time period, the failed SMTP extension may be offered.

As is well known in the art, various SMTP extensions are associated with an SMTP session (e.g., STARTTLS, AUTH, etc.), whereas other SMTP extensions are associated with an SMTP transaction. For a set of SMTP extensions that is associated with an SMTP session and that failed, the MX server may be store in the MX server's failure database a set of identifiers, which respectively identifies the set of SMTP extensions. According to one embodiment of the present invention, the MX server will not offer these one or more failing SMTP extensions to the mail client for every SMTP session, which the MX server and mail client engage in. That is, an MX server storing the identifier for this mail client and the set of identifiers for the set of SMTP extensions, which fail, will not offer to the mail client the one or more failing SMTP extensions for any future sessions within the predetermined time period, which is described above.

A set of identifiers that respectively identifies the set of SMTP extensions, which is associated with a transaction and a set of failures, may also be stored in the MX server's failure database or the mail client's failure database as described above. According to one embodiment, the set of SMTP extensions that failed will not be offered again by the MX server to the mail client in the given session in which the one or more failures occurred. According to another embodiment, the set of SMTP extensions that failed will not be issued again by the mail client to the MX server in the given session in which the one or more failures occurred. For example, if the "by" extension is in a MAIL command issued by the mail client to the MX server, then the mail client might not issue the "by" extension the next time the particular e-mail associated with the particular session is resent in another delivery attempt.

According to one embodiment of the present invention, the method described above with respect to FIG. 2 might operate with the mail client issuing various SMTP commands, which may include one or more SMTP extensions, to the MX server. The method operates in essentially the same manner with the mail client having access to a failure database on the machine-readable memory of computer system 110 and storing an identifier for the MX server and a set of identifiers for a set of failing SMTP extensions should one or more SMTP extensions issued to the MX server fail. If an SMTP extension sent to the MX server failed, the mail client might not try the failing SMTP extension with the MX server within a predetermined time period. This method is described in further detail immediately below.

FIG. 3 is a high-level flow diagram of an electronic communication method 300 according to one embodiment of the present invention. At an initial step 305, a mail client issues a set of SMTP extensions with an SMTP command to an MX server for an initial electronic communication. At a step 310, if the SMTP command and the SMTP extensions do not fail (e.g., do not produce an unexpected response from the MX server), the SMTP command, the set of SMTP extensions, and the electronic communication associated therewith are carried out and the method ends. If SMTP command and one or more of the extensions in the set of SMTP extension fails (e.g., produce an unexpected response from the MX server to the mail client), the mail client is configured to determine which of the SMTP extension failed (step 315). The determination of a SMTP command failure is well understood by those of skill in the art and will not be described in detail herein. The particular SMTP extension that failed in a set of SMTP extension may be determined by a variety of techniques, such as those described above including the mail client removing one or more of the SMTP extensions from the set of SMTP extension and reissuing the SMTP command and the set of SMTP extensions (where the set does not include the removed SMTP extensions) to attempt to determine the exact SMTP extension that caused the failure. SMTP extensions may be removed from an SMTP command one-by-one, may be removed in sets of two or more, and may be removed in a select order (first to last, last to first, etc.), etc. SMTP extensions may also be removed based on a known likelihood of the SMTP extensions that are most likely to have failed. That is, one or more SMTP extensions that have a high likelihood of failure may be removed from a SMTP command before other SMTP extensions having a lower likelihood to fail are removed from the SMTP command. A variety of combinations of SMTP extensions might be removed to determine the particular SMTP extension that failed.

Once the particular one or more SMTP extensions that failed are identified, at a step 320, the mail client is configured to store an identifier for the MX server and store a set of identifiers for the one or more SMTP extensions that failed for this MX server. According to one embodiment, step 320 is not executed unless the SMTP extension that failed, fails more than a predetermined threshold number of times. That is, the MX server is given a number of chances to use correctly to the one or more SMTP extensions in an SMTP command in case the error is temporary on a relatively short term basis.

The identifier for the MX server may be any of a variety of identifiers that identify the MX server, such as a domain name, an IP address, etc. The identifiers for the SMTP extensions may include text strings for the SMTP extension, may includes codes (numeric, alphanumeric, symbols, etc.) that identify the SMTP extensions, or the like. The mail client may store (e.g., create or updates an entry) the identifier for the MX server and the set of identifiers for the one or more failing SMTP extensions in a failure database 175 in the mail client's machine-readable memory. According to a specific embodiment, mail client is configured to store a time stamp and a date stamp for the time and date at which the entry was made in the machine-readable memory.

At a step 325, if the mail client communicates with this particular MX server at a later time, the mail client is configured to retrieve from failure database 175 the stored identifiers for the one or more failed SMTP extensions. At a step 330, for the communication of step 325, the mail client will not issue these particular failing SMTP extensions in the SMTP commands sent to this particular MX server. Step 330 may be executed within a predetermined period of time. For example, step 330 may be executed five minutes after the failures with the SMTP extensions are determined to allow the mail client to re-attempt the electronic communication with the original SMTP commands and the original SMTP extensions with this particular MX server in case the failures are temporary. Step 330 might not be executed the following day, e.g., 24 hours later. The above described time period of 5 minutes to 24 hours is an example time period and is not limiting on the claims.

It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A computerized method for electronic communication comprising:
issuing via a mail client a set of extensions in a command to an MX server for an initial electronic communication;
determining in the mail client one or more of the extensions, which failed;
for a subsequent electronic communication between the mail client and the MX server, for a predetermined time period, not issuing to the MX server by the mail client the one or more extensions, which failed;
storing via the mail client in a failure database an identifier for the MX server;
storing via the mail client in the failure database a set of identifiers, wherein the set of identifiers respectively identifies the one or more extensions, which failed; and
prior to the step of not issuing, querying the failure database for the identifier for the MX server, and the set of identifiers for the one or more extensions, which failed, and the step of not issuing is based on the querying step.

2. A computerized method for electronic communication comprising:
issuing via a mail client a set of extensions in a command to an MX server for an initial electronic communication;
determining in the mail client one or more of the extensions, which failed;
for a subsequent electronic communication between the mail client and the MX server, for a predetermined time period, not issuing to the MX server by the mail client the one or more extensions, which failed; and
for a subsequent electronic communication between the mail client and the MX server, for a predetermined time period, issuing an extension to the MX server by the mail client wherein the extension issued in the subsequent electronic communication is not the one or more extensions, which failed.

3. A computerized method for electronic communication comprising:
issuing via a mail client a set of extensions in a command to an MX server for an initial electronic communication;
determining in the mail client one or more of the extensions, which failed; and
for a subsequent electronic communication between the mail client and the MX server, for a predetermined time period, not issuing to the MX server by the mail client the one or more extensions, which failed,
wherein the step of not issuing is carried out for a predetermined period of time.

4. A computerized method for electronic communication comprising:
issuing via a mail client a set of extensions in a command to an MX server for an initial electronic communication;
determining in the mail client one or more of the extensions, which failed;
for a subsequent electronic communication between the mail client and the MX server, for a predetermined time period, not issuing to the MX server by the mail client the one or more extensions, which failed; and
after the predetermined period of time, issuing the one or more extension, which failed, to the MX server by the mail client.

5. A computerized method for electronic communication comprising:
issuing via a mail client a set of extensions in a command to an MX server for an initial electronic communication;
determining in the mail client one or more of the extensions, which failed; and
for a subsequent electronic communication between the mail client and the MX server, for a predetermined time period, not issuing to the MX server by the mail client the one or more extensions, which failed,
wherein:
the one or more extensions that failed are for a transaction,
the initial electronic communication is in an initial session,
the subsequent electronic communication is in the initial session, and
the step of not issuing to the MX server by the mail client the one or more extension, which failed, is in the initial session, but is not in a subsequent session, which follows the initial session.

6. A computerized method for electronic communication comprising:
issuing via a mail client a set of extensions in a command to a MX server for an initial electronic communication;
determining in the mail client one or more of the extensions, which failed; and
for a subsequent electronic communication between the mail client and the MX server, for a predetermined time period, issuing via the mail client another extension to the MX server, wherein the other extension is not the one or more extensions, which failed.

7. The method of claim 6, further comprising:
storing via the mail client in a failure database an identifier for the MX server;
storing via the mail client in the failure database a set of identifiers, wherein the set of identifiers respectively identifies the one or more extensions, which failed; and
prior to the second mentioned issuing step, querying the failure database for the identifier for the MX server and the set of identifiers for the one or more extensions, which failed, and the second mentioned issuing step is based on the querying step.

8. The method of claim 7, for the subsequent electronic communication between the mail client and the MX server, for the predetermined time period, not issuing to the MX server by the mail client the one or more extensions, which failed.

9. The method of claim 7, further comprising: after the predetermined period of time, issuing the one or more extension, which failed, to the MX server by the mail client.

10. The method of claim 6, wherein:
the one or more extensions that failed are for a session,
the initial electronic communication is in an initial session,
the subsequent electronic communication is in a subsequent session, which follows the initial session, and
the step of issuing via the mail client the other extension to the MX server is in the subsequent session.

11. The method of claim 6, wherein:
the one or more extensions that failed are for a transaction,
the initial electronic communication is in an initial session,
the subsequent electronic communication is in the initial session, and
the step of issuing via the mail client the other extension to the MX server, is in the initial session, but is not in a subsequent session, which follows the initial session.

12. A computer system comprising:
a processor configured to execute an electronic communication process, wherein the communication process includes:
issuing a set of extensions in a command to a MX server for an initial electronic communication;
determining one or more of the extensions, which failed; and
for a subsequent electronic communication to the MX server, for a predetermined time period, issuing another extension to the MX server, wherein the other extension is not the one or more extensions, which failed.

13. The computer system of claim 12, further comprising a machine-readable memory, wherein the communication process further includes:
storing in a failure database in the machine-readable memory an identifier for the MX server;
storing in the failure database in the machine-readable memory a set of identifiers, wherein the set of identifiers respectively identifies the one or more extensions, which failed; and
prior to the second mentioned issuing step, querying the failure database in the machine-readable memory for the identifier for the MX server and the set of identifiers for the one or more extensions, which failed, and the second mentioned issuing step is based on the querying step.

14. The computer system of claim 13, for the subsequent electronic communication to the MX server, for the predetermined time period, not issuing to the MX server the one or more extensions, which failed.

15. The computer system of claim 14, further comprising: after the predetermined period of time, issuing the one or more extension, which failed, to the MX server.

16. The computer system of claim 13, wherein:
the one or more extensions that failed are for a session,
the initial electronic communication is in an initial session,
the subsequent electronic communication is in a subsequent session, which follows the initial session, and
the step of issuing the other extension to the MX server is in the subsequent session.

17. The computer system of claim 13, wherein:
the one or more extensions that failed are for a transaction,
the initial electronic communication is in an initial session,
the subsequent electronic communication is in the initial session, and
the step of issuing the other extension to the MX server, is in the initial session, but is not in a subsequent session, which follows the initial session.

18. A computerized method for electronic communication comprising:
offering via an MX server a set of extensions in an SMTP response to a mail client for an initial electronic communication;
determining in the MX server one or more of the extensions, which failed; and
for a subsequent electronic communication between the MX server and the mail client, for a predetermined time period, not offering to the mail client by the MX server the one or more extensions, which failed.

19. The method of claim 18, further comprising:
storing via the MX server in a failure database an identifier for the mail client;
storing via the MX server in the failure database a set of identifiers, wherein the set of identifiers respectively identifies the one or more extensions, which failed; and
prior to the step of not offering, querying the failure database for the identifier for the mail client, and the set of identifiers for the one or more extensions, which failed, and the step of not offering is based on the querying step.

20. The method of claim 18, further comprising: for a subsequent electronic communication between the MX server and the mail client, for a predetermined time period, offering an extension to the mail client by the MX server wherein the extension offered in the subsequent electronic communication is not the one or more extensions, which failed.

21. The method of claim 18, wherein the step of not offering is carried out for a predetermined period of time.

22. The method of claim 18, further comprising: after the predetermined period of time, offering the one or more extension, which failed, to the mail client by the MX server.

23. The method of claim 18, wherein:
the one or more extensions that failed are for a session,
the initial electronic communication is in an initial session,
the subsequent electronic communication is in a subsequent session, which follows the initial session, and
the step of not offering to the mail client by the MX server the one or more extension, which failed, is in the subsequent session.

24. The method of claim 18, wherein:
the one or more extensions that failed are for a transaction,
the initial electronic communication is in an initial session,
the subsequent electronic communication is in the initial session, and
the step of not offering to the mail client by the MX server the one or more extension, which failed, is in the initial session, but is not in a subsequent session, which follows the initial session.

25. A computerized method for electronic communication comprising:
offering via an MX server a set of extensions in an SMTP response to a mail client for an initial electronic communication;
determining in the MX server one or more of the extensions, which failed; and
for a subsequent electronic communication between the MX server and the mail client, for a predetermined time period, offering via the MX server another extension to the mail client, wherein the other extension is not the one or more extensions, which failed.

26. The method of claim 25, further comprising:
storing via the MX server in a failure database an identifier for the mail client;
storing via the MX server in the failure database a set of identifiers, wherein the set of identifiers respectively identifies the one or more extensions, which failed; and
prior to the second mentioned offering step, querying the failure database for the identifier for the mail client and the set of identifiers for the one or more extensions, which failed, and the second mentioned offering step is based on the querying step.

27. The method of claim 26, for the subsequent electronic communication between the MX server and the mail client, for the predetermined time period, not offering to the mail client by the MX server the one or more extensions, which failed.

28. The method of claim 26, further comprising: after the predetermined period of time, offering the one or more extension, which failed, to the mail client by the MX server.

29. The method of claim 25, wherein:
the one or more extensions that failed are for a session,
the initial electronic communication is in an initial session, the subsequent electronic communication is in a subsequent session, which follows the initial session, and the step of offering via the MX server the other extension to the mail client is in the subsequent session.

30. The method of claim 25, wherein:

the one or more extensions that failed are for a transaction, the initial electronic communication is in an initial session, the subsequent electronic communication is in the initial session, and the step of offering via the MX server the other extension to the mail client, is in the initial session, but is not in a subsequent session, which follows the initial session.

31. A computer system comprising:

a processor configured to execute an electronic communication process, wherein the communication process includes:

offering a set of extensions in a SMTP response to a mail client for an initial electronic communication;

determining one or more of the extensions, which failed; and for a subsequent electronic communication to the mail client, for a predetermined time period, offering another extension to the mail client, wherein the other extension is not the one or more extensions, which failed.

32. The computer system of claim 31, further comprising a machine-readable memory, wherein the communication process further includes:

storing in a failure database in the machine-readable memory an identifier for the mail client;

storing in the failure database in the machine-readable memory a set of identifiers, wherein the set of identifiers respectively identifies the one or more extensions, which failed; and prior to the second mentioned offering step, querying the failure database in the machine-readable memory for the identifier for the mail client and the set of identifiers for the one or more extensions, which failed, and the second mentioned offering step is based on the querying step.

33. The computer system of claim 31, for the subsequent electronic communication to the mail client, for the predetermined time period, not offering to the mail client the one or more extensions, which failed.

34. The computer system of claim 31, further comprising: after the predetermined period of time, offering the one or more extension, which failed, to the mail client.

35. The computer system of claim 31, wherein:

the one or more extensions that failed are for a session, the initial electronic communication is in an initial session, the subsequent electronic communication is in a subsequent session, which follows the initial session, and the step of offering via the MX server the other extension to the mail client is in the subsequent session.

36. The computer system of claim 31, wherein:

the one or more extensions that failed are for a transaction, the initial electronic communication is in an initial session, the subsequent electronic communication is in the initial session, and the step of offering the other extension to the mail client, is in the initial session, but is not in a subsequent session, which follows the initial session.

37. The computer system of claim 31, wherein the computer system is a mail server.

* * * * *